United States Patent [19]

Oba et al.

[11] 4,206,250

[45] Jun. 3, 1980

[54] PROCESS FOR PRODUCING PIGMENT-COATED PHOSPHORS

[75] Inventors: Yoichi Oba, Hachioji; Katuzo Kanda, Oisomachi; Shusaku Eguchi; Kazuhito Iwasaki, both of Odawara, all of Japan

[73] Assignees: Hitachi, Ltd.; Kasei Optonix, Ltd., both of Japan

[21] Appl. No.: 954,870

[22] Filed: Oct. 26, 1978

[30] Foreign Application Priority Data

Nov. 9, 1977 [JP] Japan ................... 52-133389

[51] Int. Cl.$^2$ ............ B05D 5/06; H01J 29/20
[52] U.S. Cl. .................. 427/64; 252/301.36; 428/403; 428/407; 427/68; 427/218; 427/221
[58] Field of Search .......... 427/64, 68, 218, 214, 427/215, 221; 428/403, 407; 260/42.15; 252/301.36

[56] References Cited

U.S. PATENT DOCUMENTS

| | | | |
|---|---|---|---|
| 3,544,354 | 12/1970 | Kachel | 427/217 |
| 3,574,663 | 4/1971 | Schniepp | 427/68 |
| 3,875,449 | 4/1975 | Byler | 252/301.65 |
| 4,049,845 | 9/1977 | Lozier | 427/68 |

FOREIGN PATENT DOCUMENTS 723868 2/1955 United Kingdom ............ 252/326

Primary Examiner—Sam Silverberg
Attorney, Agent, or Firm—Craig and Antonelli

[57] ABSTRACT

A pigment-coated phosphor having good finish sieve passability and capable of forming a fluorescent film with excellent properties can be produced from a process characterized by:

(1) the first step of adding to a water suspension of a phosphor and a pigment an anionic polymer emulsion which has a minimum film forming temperature of less than 30° C.;

(2) the second step of adding a cationic polymer emulsion which has a minimum film forming temperature of 30° C. or lower;

(3) the thrid step of adding an anionic polymer emulsion which has a minimum film forming temperature of 30° C. or higher; and (4) the fourth step of making the mixture system neutral or weakly acidic.

18 Claims, No Drawings

PROCESS FOR PRODUCING PIGMENT-COATED PHOSPHORS

BACKGROUND OF THE INVENTION

This invention relates to a process for producing a pigment-coated phosphor in which the color filter particles (hereinafter referred to as "pigment") adhere fastly to the surfaces of the phosphor particles and which can be used for the production of the high-contrast cathode-ray tubes for color television receivers.

The prior art for producing the pigment-coated phosphors includes the S. A. Lipp process (U.S. Pat. No. 3,886,394) and the G. S. Lozier et al process (U.S. Pat. No. 4,049,845). According to the former process, a gelatin-adsorbed phosphor is contacted with a polyvinylpyrrolidone-adsorbed pigment so that the pigment adheres to the phosphor surface. The thus produced pigment-coated phosphor, however, is unsatisfactory in pigment-phosphor adhesion and it was found that the pigment is liable to separate from the phosphor during the steps of preparation, ageing and coating of the phosphor slurry practiced in a usual way.

According to the Lozier et al process, a phosphor having adsorbed therein colloidal particles of a latex is mixed with a pigment or a pigment having adsorbed therein colloidal particles of a latex in an aqueous medium and the mixture is coagulated to obtain a pigment-coated phosphor. Various means are disclosed for effecting said coagulation, such as changing the pH of the medium, changing the medium temperature, adding polyvalent cations to the medium, adding a water-soluble organic solvent, etc.

Some of the present inventors have previously proposed a process for producing a pigment-coated phosphor by mixing a phosphor, a pigment and an anionic emulsion in an aqueous medium, adding thereto a cationic emulsion and, if need be, making the mixture system neutral or weakly acidic (Japanese Patent Appln. No. 151988/76 corresponding to U.S. patent appln. Ser. No. 862156).

Both the Lozier et al process and the process of the above-said Japanese application are capable of producing pigment-coated phosphors wherein the pigment adheres fastly to the phosphor, but it was found that the pigment-coated phosphors obtained according to these processes still have some serious problems. For instance, when the obtained dry cakes are passed through, for example, a 300-mesh sieve (Tyler standard), they are sparingly passable through such a sieve, resulting in a very low workability. Also, dispersibility of the phosphor coating slurry is poor and no good filling is provided when the fluorescent film is formed, so that no homogenous coating film is obtained, resulting in reduced luminous brightness in the same film thickness, and there also takes place color mixing or cross-contamination when the phosphor is applied on the cathode-ray tube for color television receivers. (The term "Cross-contamination" means a phenomenon that takes place when a second or third luminous component phosphor to be applied on the face plate of the cathode-ray tube is coated with the slurry, exposed and developed to form the dots or stripes thereof, and such phosphor remains on the already formed dots or stripes of other luminous component phosphor.)

Some improvements for sieving workability have been proposed, such as a method for making the mixture system non-adhesive by hardening a resin binder included therein, but it was found that when said resin binder is hardened, it becomes brittle to cause separation of the pigment from the phosphor during ageing of the phosphor slurry.

SUMMARY OF THE INVENTION

An object of this invention is to provide an improved process for producing a pigment-coated phosphor.

Another object of this invention is to provide a process for producing a pigment-coated phosphor having high pigment-phosphor adhesion and being greatly improved in finish sieving workability. Still another object of this invention is to provide a process for producing a pigment-coated phosphor which is easy to sieve, has high dispersibility in the state of coating slurry and is perfectly free from non-uniformity of the film quality, drop of luminous brightness and cross-contamination due to drop of filling when a phosphor film is formed, and in which the fine particles of the pigment are fastly attached to the phosphor surface.

Thus, there is provided according to this invention a process for producing a pigment-coated phosphor comprising:

(1) the first step of adding to an aqueous suspension of a phosphor and a pigment an anionic emulsion which has a minimum film forming temperature of less than 30° C.;

(2) the second step of adding thereto a cationic emulsion which has a minimum film forming temperature of 30° C. or lower;

(3) the third step of adding thereto an anionic emulsion which has a minimum film forming temperature of 30° C. or higher; and (4) the fourth step of making the mixture system neutral or weakly acidic.

DETAILED DESCRIPTION OF PREFERRED EMBODIMENT

The process of this invention is described in more detail stepwise below.

First, a phosphor is suspended in water, and to this suspension is added a predetermined amount of an aqueous suspension of a pigment which has been previously prepared by well dispersing a pigment in water by using a suitable means such as a ball mill, and the mixture is stirred up well.

This mixed suspension, while continuously stirred, is further added successively with an anionic emulsion having a minimum film forming temperature of less than 30° C. in the first step, then with a cationic emulsion having a minimum film forming temperature of 30° C. or lower in the second step, and then with an anionic emulsion having a minimum film forming temperature of 30° C. or higher in the third step, and thereafter the mixture system is made neutral (pH=7) or weakly acidic (pH=3 or more, preferably pH 4 or more) with hydrochloric acid, acetic acid or the like in the fourth step.

The thus obtained pigment-coated phosphor is further subjected to the steps of washing with water, hydro-extraction, drying, finish sieving etc., according to the usual methods and finally offered in the form usable for coating of the cathode-ray tubes for color television receivers.

Some preferred examples of the pigment-phosphor combinations usable in the invention are shown below.

{ Green pigment: Chromium oxide (Cr₂O₃)
  Green luminescent phosphor: Copper and aluminum-activated zinc sulfide (ZnS: Cu, Al)
{ Blue pigment: Cobalt aluminate (CoO . n Al₂O₃)
  Blue luminescent phosphor: Silver-activated zinc sulfide (ZnS: Ag)
{ Red pigment: α-Iron oxide (α-Fe₂O₃)
  Red luminescent phosphor: Europium-activated yttrium oxysulfide (Y₂O₂S: Eu)

It is of course possible to use other pigment-phosphor combinations usually employed in this field.

The anionic emulsion used in this invention includes preferably emulsions of copolymers of at least one non-ionic acrylic monomer, for example an acrylic or methacrylic acid alkyl ester such as methyl acrylate, ethyl acrylate, butyl acrylate, methyl methacrylate, etc., or a non-acrylic monomer such as styrene, and an anionic monomer, for example an α,β-ethylenically unsaturated monomer having at least one carboxyl group such as acrylic acid, methacrylic acid, itaconic acid, etc. Particularly preferred is a emulsion of copolymer of an acrylic or methacrylic acid alkyl ester such as cited above and an α,β-ethylenically unsaturated monomer having at least one carboxyl group.

The cationic emulsion used in this invention includes preferably emulsions of copolymers of at least one non-ionic monomer such as above-mentioned and a cationic monomer, for example an ester of tertiary alkanolamine and acrylic or methacrylic acid such as dimethylaminoethyl acrylate, diethylaminoethyl acrylate, dimethylaminoethyl methacrylate, etc.

On the other hand, a polymer emulsion (which is also called as a latex) usually has a "minimum film forming temperature" (hereinafter referred to as "MFT") around a glass transition temperature (Tg) of the polymer which constitute the emulsion. MFT is a measure expressing that when the emulsion is dried at a temperature higher than the MFT, a continuous film is formed.

The anionic emulsion used in the first step of this invention is the one having an MFT of less than 30° C., preferably 10° C. or lower. The anionic emulsion used in the third step is of the type having an MFT of 30° C. or higher, preferably 60° C. or higher but not exceeding 85° C.

The cationic emulsion used in the second step is more preferably the one having an MFT of between 0° and 30° C.

Of the emulsions used in this invention, those which are commercially available have their MFT already determined by actual measurements. As for the emulsions produced by way of trial, their Tg was calculated from the component monomer composition by using the following equation. MFT was actually measured for a part of the trial emulsions.

$$1/Tg = W_1/Tg_1 + W_2/Tg_2 + W_3/Tg_3$$

wherein $Tg_1$, $Tg_2$ and $Tg_3$ are the glass transition temperature of the respective pure single polymers 1, 2 and 3, such glass transition temperature being expressed by way of absolute temperature, and $W_1$, $W_2$ and $W_3$ are the weight fractions of the monomer components 1, 2 and 3, respectively.

As seen from the above equation, Tg (or MFT) of the emulsion is regulated by the kind and amount of the monomer constituting the resin which is the main component of the emulsion.

The relation between resin composition and Tg (or MFT) as determined on some typical examples of the emulsions used in this invention is shown in Table 1 below.

Table 1

| Symbol | Commercial name or resin composition | Tg | MFT |
|---|---|---|---|
| A-1 | EA/MMA/AA = 97.0/0/3.0 (weight ratio) | −20° C. | <0° C. |
| 2 | EA/MMA/AA = 84.5/15.0/0.5 | −8° C. | <0° C. |
| 3 | EA/MMA/AA = 84.0/15.0/1.0 | −8° C. | <0° C. |
| 4 | EA/MMA/AA = 82.0/15.0/3.0 | −7° C. | <0° C. |
| 5 | EA/MMA/AA = 79.5/20.0/0.5 | −6° C. | <0° C. |
| 6 | EA/MMA/AA = 79.0/20.0/1.0 | −6° C. | <0° C. |
| 7 | EA/MMA/AA = 74.0/25.0/1.0 | −1° C. | <0° C. |
| 8 | EA/MMA/AA = 68.0/29.0/3.0 | 8° C. | 5° C. |
| 9 | EA/MMA/AA = 59.0/40.0/1.0 | 17° C. | 20° C. |
| 10 | EA/MMA/AA = 49.5/49.5/1.0 | 29° C. | 30° C. |
| 11 | EA/MMA/AA = 29.0/68.0/3.0 | 56° C. | 60° C. |
| 12 | EA/MMA/MAA = 84.0/15.0/1.0 | −8° C. | 0° C. |
| 13 | EA/MMA/MAA = 48.0/49.0/3.0 | 31° C. | 30° C. |
| 14 | MMA/nBMA/AA = 48.0/49.0/3.0 | 59° C. | 85° C. |
| C-1 | E1070 (Rohm & Haas) | — | <0° C. |
| 2 | E1126 (Rohm & Haas) | — | <0° C. |
| 3 | E1133 (Rohm & Haas) | — | <0° C. |
| 4 | EA/MMA/DMAEMA = 97.0/0/3.0 | — | <0° C. |
| C-5 | EA/MMA/DMAEMA = 69.5/30.0/0.5 | — | 10° C. |
| 6 | EA/MMA/DMAEMA = 49.5/49.5/1.0 | — | 30° C. |
| 7 | EA/MMA/DEAEA = 49.5/49.5/1.0 | — | 30° C. |

Note
A: Anionic emulsion
EA: Ethyl acrylate
AA: Acrylic Acid
MAA: Methacrylic acid
DEAEA: Diethylaminoethyl acrylate
C: Cationic emulsion
MMA: Methyl methacrylate
DMAEMA: Dimethylaminoethyl methacrylate
nBMA: n-Butyl methacrylate The proportion of the emulsion (in terms of solids content) based on the weight of phosphor is usually as follows:

(1) 0.05 to 0.5% by weight, preferably 0.1 to 0.4% by weight, in the case of the anionic emulsions with MFT of less than 30° C. (for example, A-1 to 9 and A-12 in Table 1). If the proportion is less than 0.05% by weight, no satisfactory adhesion is provided, and if it exceeds 0.5% by weight, finish sieving is extremely retarded.

(2) 0.05 to 0.5% by weight, preferably 0.1 to 0.4% by weight, in the case of the cationic emulsions with MFT of 30° C. or lower (for example, C-1 to 7 in Table 1).

(3) 0.1 to 1.0% by weight, preferably 0.2 to 0.5% by weight, in the case of the anionic emulsions with MFT of 30° C. or higher. If the proportion is less than 0.1% by weight, the finish sieving performance is not improved, while addition of the emulsion in excess of 1.0% by weight does not lead to any further improvement of the finish sieving performance.

From the characteristics of the polymer emulsions used as binder, the essential features of this invention may be considered as follows.

When an anionic emulsion composed of a soft and tacky resin is contacted with a cationic emulsion, both emulsions are broken owing to their electrical interaction, and at this time, the pigment and phosphor are strongly bonded together. These combined pigment and phosphor particles, however, are hard to pass through the finish sieve because the binder is still soft and tacky. Therefore, an anionic emulsion composed of a hard resin is added thereto so that the phosphor surface is coated with a hard resin layer. This eliminates tackiness of the phosphor surface of and improves the finish sieve passing characteristic, resulting in improved dispersibility of the phosphor coating slurry and elimination of drop of brightness and cross-contamination due to drop of filling when the phosphor film is formed.

The invention is now described in further detail by way of some examples thereof. Although these examples refer to only the case where a red pigment was adhered to a red luminescent phosphor, it will be obvious that this invention can be well applied to other combinations of phosphors and pigments.

EXAMPLE 1

1.5 gr of α-iron oxide (α-$Fe_2O_3$), which is a red pigment, and 25 gr of water were milled for 2 days by a ball mill, and this mixture was diluted by adding 50 gr of water.

In the meantime, 500 gr of a red luminescent phosphor ($Y_2O_2S$: Eu) was dispersed in 500 gr of water, and the above-said diluted pigment slurry was added to this suspension, repeating this procedure for preparing four identical specimens. The thus prepared individual specimens were then subjected to one of the following operations with agitation.

Run No. (1) To one of the above-said pigment-phosphor mixtures was added 0.5 gr (by solid content) of the anionic emulsion A-1 listed in Table 1, then 0.5 gr (by solid content) of the cationic emulsion C-5 listed in Table 1 and then 1.5 gr (by solid content of the anionic emulsion A-10 listed in Table 1.

Run No. (2) To one of the mixtures was added 1.0 gr (by solid content) of the anionic emulsion A-4 listed in Table 1, then 0.5 gr (by solid content) of the cationic emulsion C-6 listed in Table 1 and further 1.5 gr (by solid content) of the anionic emulsion A-10 listed in Table 1.

Run No. (3) To one of the mixtures was added 1.5 gr (by solid content) of the anionic emulsion A-7 listed in Table 1, then with 1.5 gr (by solid content) of the cationic emulsion C-6 listed in Table 1 and then 1.5 gr (by solid content) of the anionic emulsion A-10 listed in Table 1.

Run No. (4) To one of the mixtures was added 2.0 gr (by solid content) of the anionic emulsion A-8 listed in Table 1, then 1.5 gr (by solid content) of the cationic emulsion C-6 listed in Table 1 and then 1.5 gr (by solid content) of the anionic emulsion A-10 listed in Table 1.

Thereafter, pH of each system was adjusted to be within the range of 4.0 to 5.5 by adding hydrochloric acid, followed by washing with water, hydro-extraction, drying and finish sieving (with a 300-mesh sieve) in usual way.

For evaluating the sieving workability, the lightly crushed dry phosphor masses were subjected to shaking sieving at the constant voltage of 50 V by using Tyler's 300-mesh standard sieve and the time required for the entire 500 gr of the pigment-coated phosphor to pass through the sieve was measured.

As a result, the product according to the S. A. Lipp process required 25 minutes while the products according to the Lozier et al process and the process of Japanese Pat. Appln. No. 151988/76 took 20 to 60 minutes, whereas the products according to Run Nos. (1) to (4) of this invention required only 5, 8, 6 and 4 minutes, respectively.

The pigment-phosphor adhesion was evaluated in the following way.

20 gr of the pigment-coated phosphor was put into 60 ml of an aqueous solution having the following composition:

| | |
|---|---|
| 10% polyvinyl alcohol solution | 100 g |
| 5% neutral aqueous solution of ammonium bichromate | 18 ml |
| 10% aqueous solution of polyoxyethylene sorbitan monolaurate ("Tween 20" mfd. by Atlas Chem. Ind.) | 1 ml |
| 5% aqueous solution of polyoxyethylene-polyoxypropylene block copolymer ("Pluronic L-92" mfd. by Asahi Denka Kogyo K.K.) | 1 ml |
| Water | 180 ml | and agitated for 30 minutes. 20 gr was sampled out from this slurry and the sample was diluted 50 times and a phosphor settling film was formed on a glass plate. The remaining slurry was allowed to stand for a whole day and night and again agitated for 30 minutes to form a phosphor settling film in the same way as done on the previous day.

The reflectance of the phosphor settling films formed at the day of the slurry preparation and the day after was measured, and the adhesion was evaluated by the degree of change of such reflectance. (Higher reflectance is indicative of higher rate of separation of the pigment from the phosphor.)

Table 2

| | Phosphor film reflectance (500 m) | | Evaluation of adhesion |
|---|---|---|---|
| Run No. | Day of slurry preparation | Day after slurry preparation | |
| (1) | 31.8% | 32.5% | Excellent |
| (2) | 32.1 | 33.9 | Excellent |
| (3) | 30.0 | 30.8 | Excellent |
| (4) | 30.3 | 31.5 | Excellent |
| Prior art (S.A. Lipp) | 35.4 | 47.3 | Poor |

Then, each 2 kg of the pigment-coated phosphor (A) according to Example 1-(1), pigment-coated phosphor (B) according to Example 1-(3), pigment-coated phosphor (C) prepared for the sake of comparison by using anionic emulsion A-1 and cationic emulsion C-4 and performing a surface treatment with gelatin, and another comparative preparation (D) using anionic emulsion A-1 for pH adjustment was put into 6 liters of an aqueous solution having the above-said composition, and each mixture was subjected to alternate dispensing and rolling for 30-day ageing. Thereafter, percent retention of pigment coating of each preparation was measured. The results are shown in Table 3 below.

Table 3

| Pigment-coated phosphor | Percent retention of pigment coating |
|---|---|
| (A) | 93% |
| (B) | 95% |
| (C) | 82% |
| (D) | 75% |

As seen from Table 3, the pigment-coated phosphors (A) and (B) obtained according to the method of this invention have high pigment coating retention. The products of this invention were also better in filling and the brightness (for the same film thickness) was improved by 3 to 5% as compared with the conventional products. Cross-contamination was also noticeably reduced in the products of this invention.

EXAMPLE 2

A dispersion of a red luminescent phosphor and a red pigment was prepared in the same way as Example 1, and each of the below listed emulsions (1) to (8) was added in the order of listing by the amounts specified (calculated as solid content), followed by the same treatment as conducted in Example 1. The symbols used for the respective emulsions are the same as those used in Table 1.

(1) A-8, 2.0 g; C-6, 0.5 g; A-11, 1.5 g
(2) A-1, 0.5 g; C-6, 0.5 g; A-11, 1.5 g
(3) A-9, 2.5 g; C-5, 1.0 g; A-11, 1.5 g
(4) A-12, 0.5 g; C-5, 1.0 g; A-10, 1.5 g
(5) A-7, 1.5 g; C-6, 0.5 g; A-13, 1.5 g
(6) A-7, 1.5 g; C-6, 0.5 g; A-14, 1.0 g
(7) A-7, 1.5 g; C-4, 0.5 g; A-10, 1.5 g
(8) A-7, 1.5 g; C-7, 1.5 g; A-10, 1.5 g

Each of the obtained pigment-coated phosphors was evaluated in the same way as Example 1. The time required for entire sieving was 5 to 10 minutes, and the pigment coating on the phosphor was sufficient for practical use.

As understood from the foregoing description, there is provided according to this invention a pigment-coated phosphor having high pigment-phosphor adhesion and excellent workability (mass-producibility).

What is claimed is:

1. A process for producing a pigment-coated phosphor comprising:
   (1) the first step of adding to a water suspension of a phosphor and a pigment an anionic polymer emulsion which has a minimum film forming temperature of less than 30° C.;
   (2) the second step of adding a cationic polymer emulsion which has a minimum film forming temperature of 30° C. or lower, whereby both the anionic polymer emulsion added in the first step and the cationic polymer emulsion added in the second step are broken and phosphor and pigment particles are strongly bonded to each other;
   (3) the third step of adding an anionic polymer emulsion which has a minimum film forming temperature of 30° C. or higher, whereby the phosphor surface is coated with a hard resin layer, thereby eliminating tackiness of the phosphor surface; and
   (4) the fourth step of making the mixture system neutral or weakly acidic.

2. A process according to claim 1, wherein neutrality or weak acidity of the system is in the pH range of 3 to 7.

3. A process according to claim 1, wherein the anionic emulsion having a minimum film forming temperature of less than 30° C. is used in an amount of 0.05 to 0.5% by weight in terms of solid content based on the weight of phosphor.

4. A process according to claim 1, wherein the cationic emulsion having a minimum film forming temperature of 30° C. or lower is used in an amount of 0.05 to 0.5% by weight in terms of solid content based on the weight of phosphor.

5. A process according to claim 1, wherein the anionic emulsion having a minimum film forming temperature of 30° C. or higher is used in an amount of 0.1 to 1% by weight in terms of solid content based on the weight of phosphor.

6. A process according to claim 5, wherein the anionic emulsion having a minimum film forming temperature of 30° C. or higher is used in an amount of 0.2 to 0.5% by weight in terms of solid content based on the weight of phosphor.

7. A process according to claim 1, wherein the anionic emulsion used in the said first step is an anionic emulsion having a minimum film forming temperature of 10° C. or lower.

8. A process according to claim 1, wherein the anionic emulsion used in the said third step is an anionic emulsion having a minimum film forming temperature of 60° C. or higher.

9. A process according to claim 2, wherein neutrality or weak acidity of the system is in the pH range of 4 to 7.

10. A process according to claim 3, wherein the cationic polymer emulsion having a minimum film forming temperature of 30° C. or lower is used in an amount of 0.05 to 0.5% by weight in terms of solid content based on the weight of phosphor.

11. A process according to claim 10, wherein the anionic polymer emulsion having a minimum film forming temperature of 30° C. or higher is used in an amount of 0.1 to 1% by weight in terms of solid content based on the weight of phosphor.

12. A process according to claim 1, wherein the cationic polymer emulsion has a minimum film forming temperature of 0°–30° C.

13. A process according to claim 3, wherein the anionic polymer emulsion having a minimum film forming temperature of less than 30° C. is used in an amount of 0.1 to 0.4% by weight in terms of solid content based on the weight of phosphor.

14. A process according to claim 4, wherein the cationic polymer emulsion having a minimum film forming temperature of 30° C. or lower is used in an amount of 0.1 to 0.4% by weight in terms of solid content based on the weight of phosphor.

15. A process according to claim 1, wherein the anionic polymer emulsion used in at least one of said first step and said third step is an emulsion of a copolymer of at least one nonionic acrylic monomer or styrene and an anionic monomer.

16. A process according to claim 15, wherein the anionic polymer emulsion used in at least one of said first step and said third step is an emulsion of a copolymer of at least one nonionic acrylic monomer and an anionic monomer, said nonionic acrylic monomer is an acrylic or methacrylic acid ester, and said anionic monomer is an $\alpha, \beta$-ethylenically unsaturated monomer having at least one carboxyl group.

17. A process according to claim 1, wherein the cationic polymer emulsion is an emulsion of a copolymer of at least one nonionic acrylic monomer or styrene and a cationic monomer.

18. A process according to claim 17, wherein the cationic monomer is an ester of tertiary alkanolamine and acrylic or methacrylic acid.

* * * * *